United States Patent [19]

Salloum

[11] Patent Number: 4,467,913

[45] Date of Patent: Aug. 28, 1984

[54] PLASTIC MONORAIL CONVEYOR DRIVE CHAIN WHEEL

[75] Inventor: James S. Salloum, Oxford, Mich.

[73] Assignee: Formall Syn-Trac Systems, Inc., Madison Heights, Mich.

[21] Appl. No.: 448,926

[22] Filed: Dec. 13, 1982

[51] Int. Cl.³ .............................................. B65G 17/32
[52] U.S. Cl. .................................... 198/687; 198/683; 104/89
[58] Field of Search .............. 198/683, 684, 686, 687, 198/834, 842, 735; 104/173 ST, 191, 96, 95, 89; 474/156, 164, 165, 198, 199, 903

[56] References Cited

U.S. PATENT DOCUMENTS

| 83,568 | 10/1868 | Toay | 474/165 |
| 1,339,574 | 5/1920 | Pfau | 474/199 X |
| 2,133,391 | 10/1938 | Lemmon | 198/684 |
| 2,569,947 | 10/1951 | Orwin | 198/683 |
| 3,045,808 | 7/1962 | Blanc | 104/95 X |
| 3,127,006 | 3/1964 | Tochtermann et al. | 198/686 |

Primary Examiner—Joseph E. Valenza
Assistant Examiner—Jonathan D. Holmes
Attorney, Agent, or Firm—Benjamin W. Colman

[57] ABSTRACT

A plastic arcuate turn wheel structure for a plastic monorail conveyor structure is disclosed. The turn wheel structure is driven by a plastic chain drive and comprises a supporting structural framework, an arcuate inverted T-bar track section, a disc supporting plate, a turn wheel which is either an idler or a driven wheel, an axial bearing hub for said wheel, and a bearing thrust collar for said wheel.

24 Claims, 10 Drawing Figures

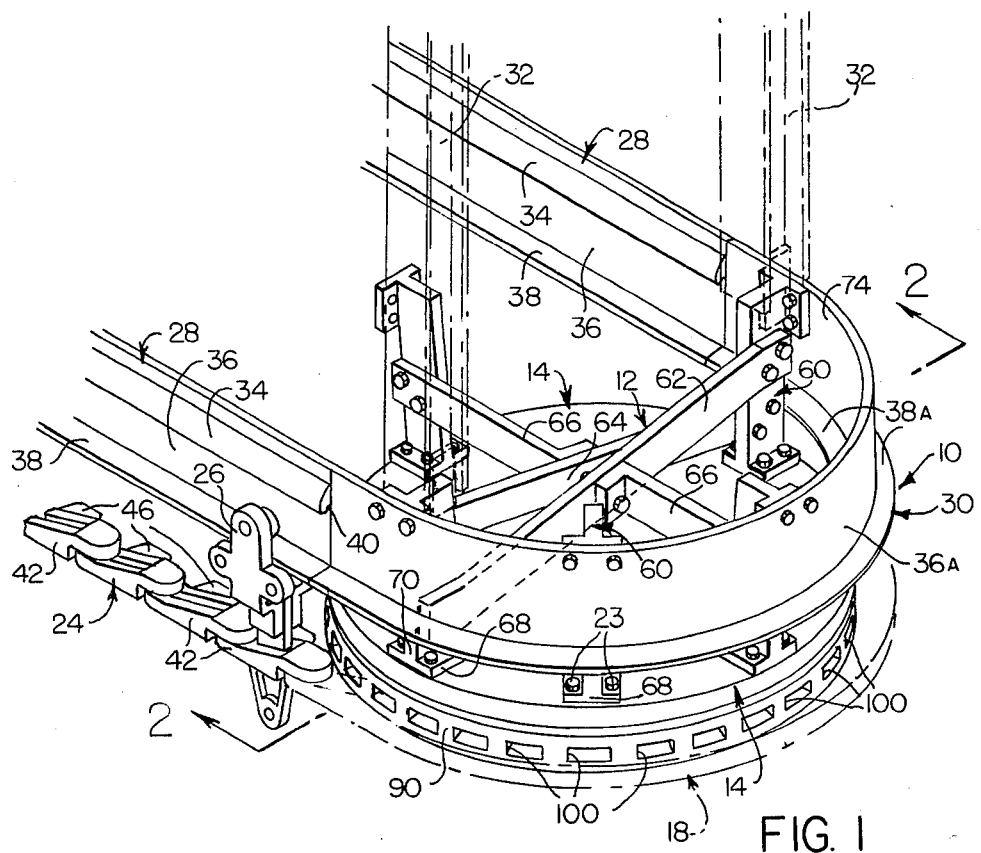
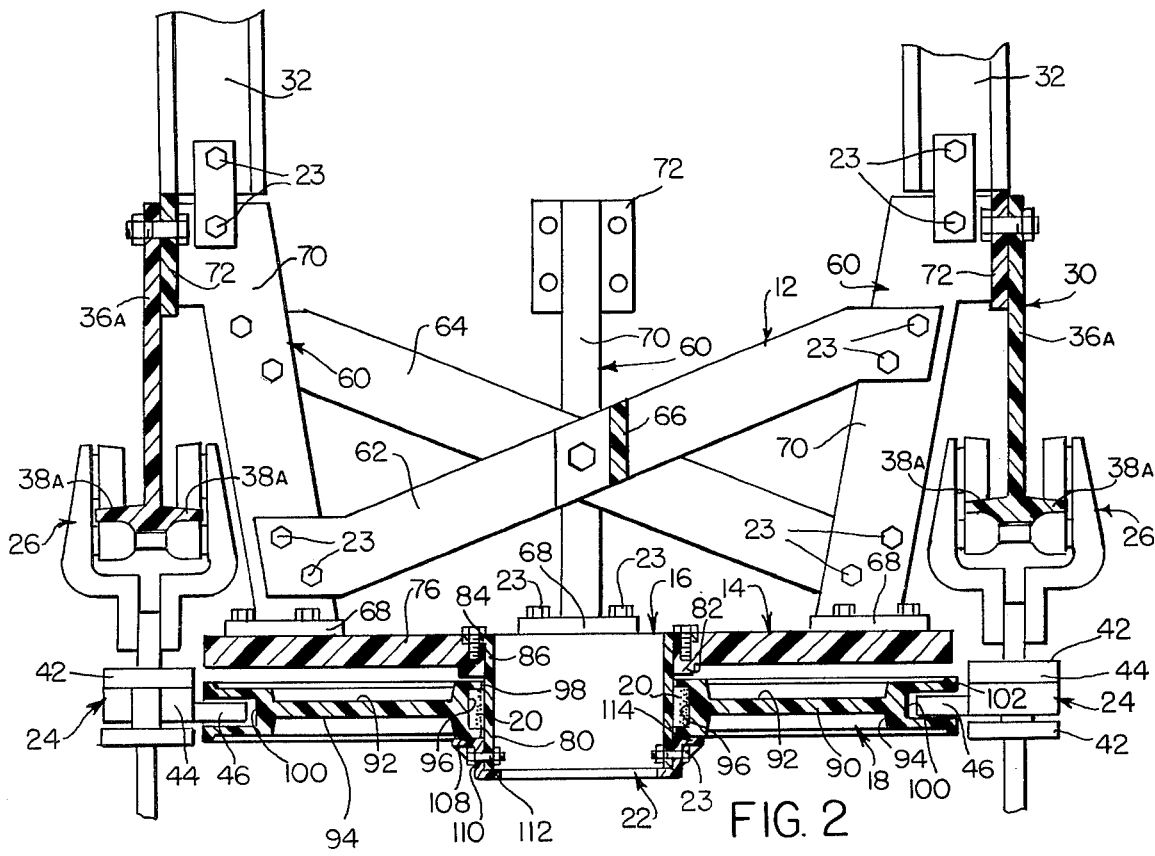

PLASTIC MONORAIL CONVEYOR DRIVE CHAIN WHEEL

CROSS-REFERENCE TO RELATED APPLICATIONS

This application and disclosure is related to my copending application Ser. No. 395,509 for Plastic Monorail Conveyor Structure, Ser. No. 395,508 for Plastic Monorail Conveyor Trolley, and Ser. No. 395,462 for Plastic Monorail Conveyor Drive Chain Linkage filed July 6, 1982.

BACKGROUND OF THE INVENTION

This invention relates to a monorail conveyor system. Heretofore, such conveyor systems have been made primarily of steel components suspended by steel supporting members welded to a building superstructure, the monorail comprising lengths of I-beams welded together at their ends to form a continuous, and usually an endless track for trolleys driven thereon by an endless drive chain. The trolleys have also been made of steel, until applicant's improved plastic trolley, disclosed in his U.S. Pat. Nos. 4,228,738 issued Oct. 2, 1980 and 4,433,627 issued Feb. 28, 1984, was introduced to the market a short time ago. Steel drive chain linkage and steel idler and drive wheels formed additional components of the prior art monorail structures and systems.

The problems attending such prior art monorail conveyor systems have included high initial material and installation costs, high maintenance and repair costs, and very high noise pollution, and a lack of color coding for safety and identification purposes. Because the principal components of steel monorail conveyor systems must be welded together, skilled workmen at high hourly rates are required to make these installations. Also, skilled tradesmen are required to assemble this equipment and install the same from supporting superstructure. Maintenance costs are high because these same skilled workmen are required to replace or repair damaged components or portions thereof. Since paint or exterior finishes adhere very poorly to steel surfaces located and operating in areas and atmospheres having a relative oily or chemical content, it is practically impossible to maintain a color on the monorail components which would function as a signal that such apparatus is present and that there may be danger to personnel in its area of operation. The lack or failure of color coding monorail equipment also constitutes an insufficiency to provide an identification of the components which are or can be carried by the system. The high decibel noise quotient results in major part from the difficulty in welding sections of the monorail in a level attachment of the I-beam trolley riding surfaces, so that a loud clickety-clack occurs each time a trolley rides across a juncture of the monorail I-beam. Where hundreds of such junctures and trolleys are present, the conveyor noise is, in some instances, highly discomforting, decreasing worker efficiency.

SUMMARY OF THE INVENTION

This invention relates to a plastic monorail conveyor drive chain idler or drive wheel. It is suspended from a building superstructure preferably by plastic components such as angles or channels (although steel structural members may also be used). An inverted plastic T-shaped monorail track section is attached to and suspended from a plurality of plastic support members attached to the supporting channels and/or angles.

The monorail conveyor wheel is rotatably secured by the plastic support members to an arcuate section of the plastic monorail conveyor track aligned with and connected to adjacent contiguous straight sections of plastic track. The chain driven wheel, positioned at turns in the conveyor system, may be an idler wheel or a motor driven drive wheel for the conveyor chain and connected trolleys.

The component members of the plastic wheel and its plastic support members are preferably made of a strong durable plastic material such for example, but not limited to, the DuPont Zytel ® ST nylon polyamide produced by the E. I. DuPont DeNemours & Company of Wilmington, Del. The wheel structure components can also be made of the Delrin ® crystalline acetal resin material made by the polymerization of formaldehyde. Either of these materials can be mixed with a fiberglass concentrate to add further strength to the plastic resin. The amount of such fiberglass additive is proportional to the weight load of the convey wheel structure, the parts to be carried thereby, the monorail and its supporting structural members. And as the load or weight requirements of these components increase, the percentage of fiberglass used with the resin material may also be increased.

The high weight load of the steel I-beam monorail, the steel trolleys carried thereon and their steel supporting structural components has been eliminated. Such high weight loads call for the consumption of large quantities of power and the energy to produce such power. Such loads mean a relatively short service life before expensive and difficult service and repairs are required. Such loads subject the monorail system to premature corrosion and failure. These and other functional limitations are avoided and eliminated by the instant invention.

The coefficient of friction of the plastic materials used in the inverted T-shaped or T-bar monorail and wheel structure is extremely low, therefore lubrication of moving parts is not required. This feature alone eliminates considerable expensive lubrication equipment, service facilities, installation and maintenance. Removal of lubricants from the site substantially eliminates one major source of contaminants dripping upon fresh or processed foods carried by or located under the conveyor system in food processing plants.

The weight reduction in the use of plastic conveyor supporting members, a plastic inverted T-bar monorail and the plastic wheel structure is of the order of about 80% less than is present in a steel conveyor system. Such weight reduction not only extends the life of the monorail itself but also the service life of the entire conveyor system. The weight reduction lowers significantly the size and capacity of drive motors and drive mechanism, with a consequent significant reduction in energy consumption.

Normally, a monorail parts conveyor track is arranged in an endless loop, for continuous circling of the trolleys and their suspended parts hangers in a single direction upon the track. Under some circumstances, however, the trolleys can be chain driven in a reciprocating manner, i.e. first traveling in one direction and then in a reverse direction on the track. The plastic components of the monorail conveyor wheel structure hereindisclosed can function in either manner.

BRIEF DESCRIPTION OF THE DRAWINGS

Various further and more specific objects, features and advantages of the invention will appear from the description given below, taken in connection with the accompanying drawings, illustrating by way of example preferred forms of the invention. Reference is here made to the drawings annexed hereto forming an integral part of this specification.

FIG. 1 is a perspective view of a plastic monorail conveyor idler wheel structure embodying a preferred form of the invention.

FIG. 2 is a vertical axial sectional view taken substantially on the line 2—2 of FIG. 1.

DESCRIPTION OF THE PREFERRED EMBODIMENTS

Figure 3:
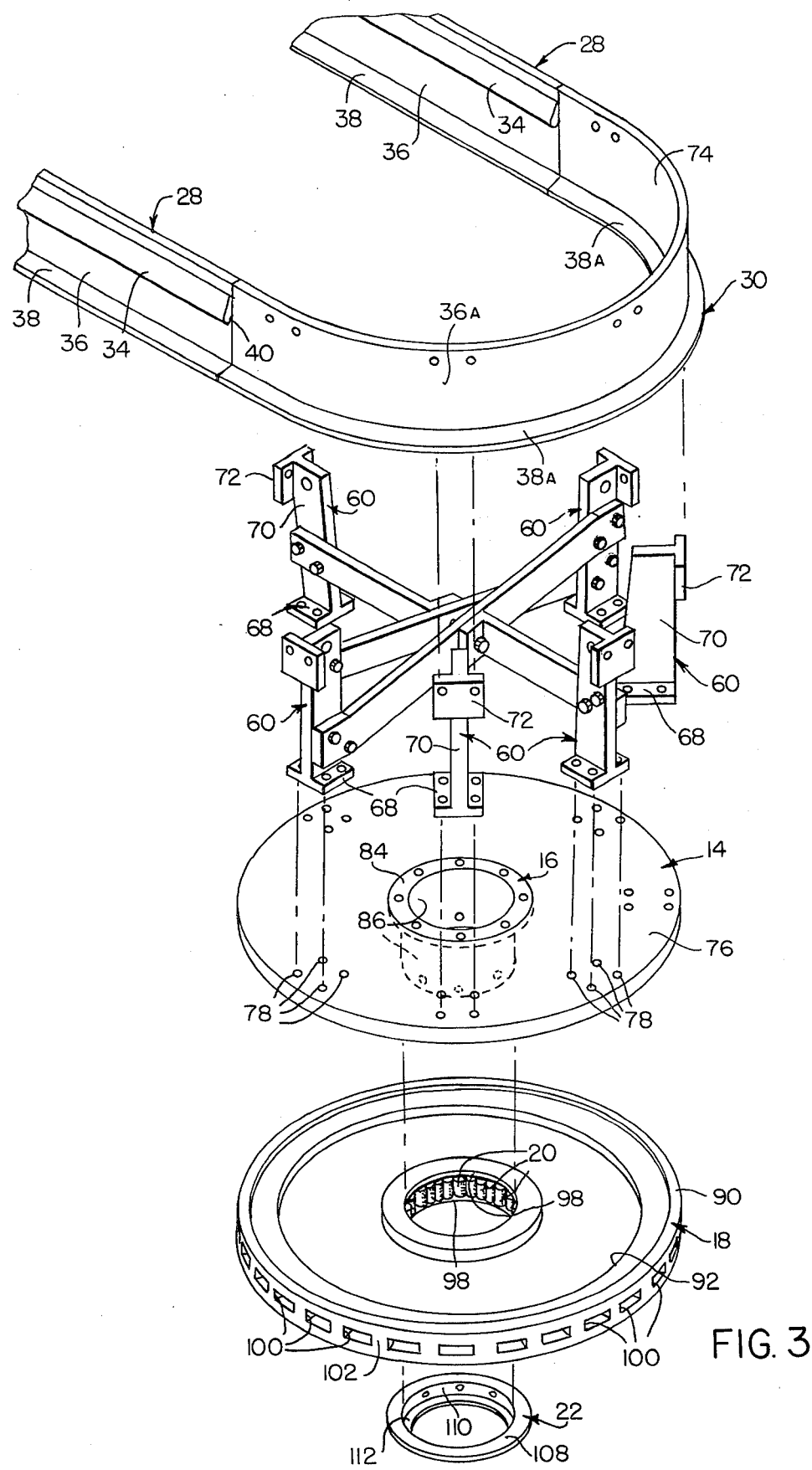
FIG. 3 is an elevational exploded perspective view of the principal components of the wheel structure illustrated in FIGS. 1 and 2.

As shown in the several views of the drawings, a preferred embodiment of the invention, the plastic monorail conveyor drive chain wheel structure 10, comprises the wheel supporting framework 12, the disc support 14, the inner race or hub 16, the rotatable wheel 18, the bearings 20, and the collar 22 upon which the wheel 18 rotates. Except for the rotatable wheel 18, these components are secured together by suitable fasteners 23, such as bolts, washers and nuts, or by any other suitable means.

The wheel 18 is driven by an endless chain linkage 24, such as is disclosed in my copending application Ser. No. 395,462. This linkage is engaged with a plurality of spaced apart trolleys 26 that ride on the monorail straight track sections 28 and arcuate track sections 30. The arcuate track section, which may be a turn of any suitable number of degrees depending on the application for which the monorail conveyor system has been installed, but which generally is in turns of 45°, 60°, 90°, and 180°, is aligned with adjoining straight track sections 28. These arcuate track sections 30 are suspended by the supporting framework 12 from the overhead supporting members 32 which are generally in the form of angles or channels, but which can be any other suitable structural form.

The straight monorail track sections 28 are of the type and style disclosed in my copending application Ser. No. 395,509. The arcuate track sections are similar in construction and composition, but (as shown) do not have the lateral pendant lobes 34, 34 which extend laterally outwardly from each side of the upstanding stem 36 of the straight T-bar section 28. In all other respects the arcuate track section 30 has the same features of construction as the straight section 28, including the laterally directed longitudinally extending flanges 38a, 38a which lie substantially in a plane on either side of the stem 36a at its distal edge and align with the inverted T-bar stem 36 and lateral flanges 38, 38 of the adjacent contiguous straight track sections 28. Each lobe 34 and the adjacent lateral surfaces of the stem 36 of the straight track section 28 form a longitudinally extending recess or slot 40 therebetween, for engagement therewith by supporting brackets as disclosed in my copending application Ser. No. 395,509.

Although the arcuate section 30 is shown and described to be free of lobes 34, 34 on the upstanding stem 36, as separate and separable elements such lobes can be attached by suitable fasteners or adhesives, if not molded on to the arcuate stem. When so affixed to the stem, the arcuate track section 30 can be suspended by such lobes from the supporting members 32, 32 by means of intermediate bracket members as described in my copending application Ser. No. 395,509. In such event, the supporting framework 12 can be simplified or, in some instances, possibly eliminated.

The trolleys 26 are of the structural design and fabrication disclosed in my copending application Ser. No. 395,508, adapted to ride on the upper and lower surfaces of the lateral flanges 38, 38, 38a, 38a of the monorail track sections 28 and 30.

The drive chain linkage 24 is made in accordance with the structural design and fabrication fully disclosed in my copending application Ser. No. 395,462. Each link 42 is articulatedly connected to the next adjacent link to form an endless chain. The link 42 comprises, in part, a body 44 and a laterally outwardly projecting drive spoke or flange 46 (optionally, a second oppositely directed spoke can be integrally formed on the link body) substantially medially, vertically and longitudinally of the body.

The supporting structure 12 comprises the vertical members 60 and their attached structural framing members 62, 64 and 66. Each of the vertical members 60 comprises a base plate 68, a vertical portion 70 and a lateral outwardly facing plate 72. The base plate 68 is secured to and upon the disc support 14 by suitable fasteners 23, such as bolts, washers and nuts, the lateral plate 72 being affixed to the arcuate section stem portion 36a at its inner surface 74, by fasteners passed through suitable openings in the disc support and stem portion. The members 62, 64 and 66 are conjoined to the vertical members 60 at the upstanding portions 70.

The disc support 14 comprises a flat circular plate 76 having a number of openings 78 therethrough for passage of the bolts 23 that secure and mount the base plates 68 of the several vertical members 60 thereon. The plate is also provided with a central axial bore 80 to receive the hub or inner race 16. An axial concentric hub section 82 projects from the lower side of the disc support plate (FIG. 2), to serve as a spacer between the disc support and the wheel 18.

The hub or inner race 16 comprises an annular outwardly directed flange 84 at its upper end adjacent the disc support plate 76 and an axial longitudinally extending bearing portion 86. The flange 84 is affixed by conventional fasteners to the upper side of the disc support plate 78, concentrically therewith.

The wheel 18 comprises an annular body portion 90 defined on each side thereof by an upper annular recess 92 and a lower annular recess 94, an annular recess 96 for the bearings 20 at its bore 98, and a plurality of substantially equally spaced apart pockets or recesses 100 in its outer periphery 102 adapted to rotatingly receive and release the spokes or flanges 46 of the chain links 42. The wheel bearings 20 rotate about and bear upon the outer cylindrical surface of the hub bearing portion 86, as the wheel 18 is driven by the chain linkage 24.

The collar 22 at the axial distal end of the wheel structure 10 comprises an upper annular outwardly directed bearing flange 108, a cylindrical axial body 110 and a lower annular inturned flange 112. The collar 22 is affixed to the cylindrical body 86 of the hub or inner race 16 by fasteners 23 or other suitable means. The wheel surface 114 rotates and bears upon the upper thrust surface of the collar flange 108.

Figure 4:
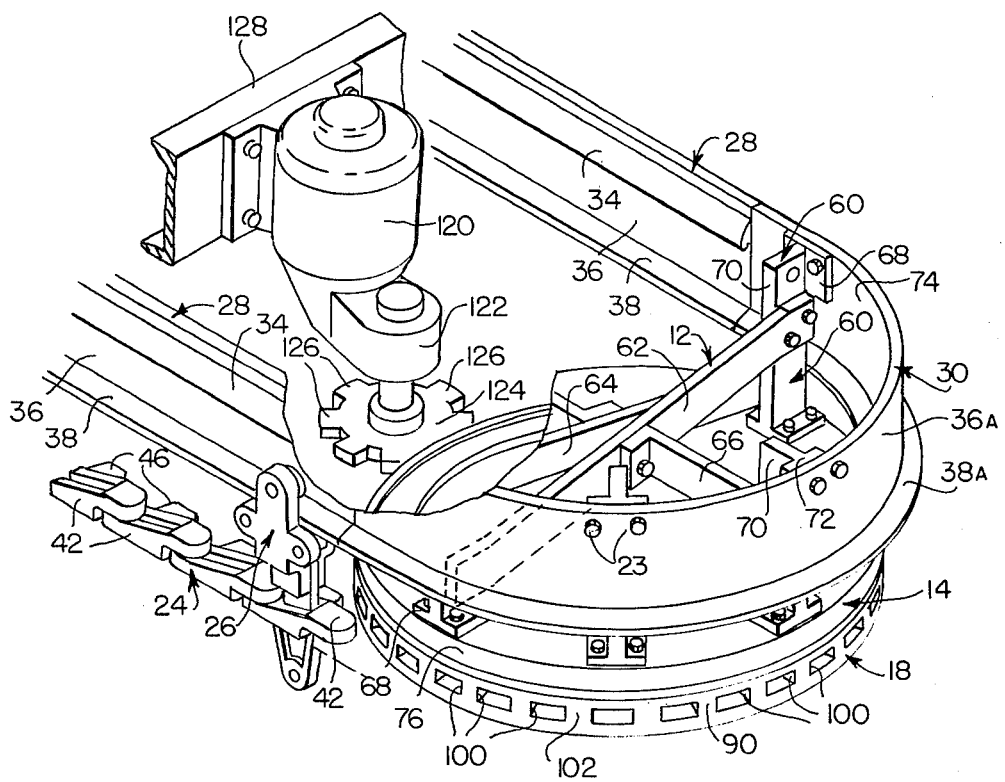
FIG. 4 is a view similar to that shown in FIG. 1, including a motor driven drive sprocket for the rotatable wheel structure of FIG. 1.

As shown more particularly in FIG. 4, the rotatable wheel 18 can be driven by a motor 120 through a speed reducer 122 and a drive sprocket 124 having spokes or flanges 126 comparable to the chain link spokes or flanges 46, in turn driving the endless chain 24 which moves the trolleys 26 along on the monorail conveyor track sections 28 and 30. Thus, the wheel 18 functions as an idler wheel or a driven/drive wheel for the monorail conveyor system. The motor 120 is mounted on supporting structure 128 of any suitable design, well within the competence of persons skilled in the art to which the invention pertains.

Figure 5:
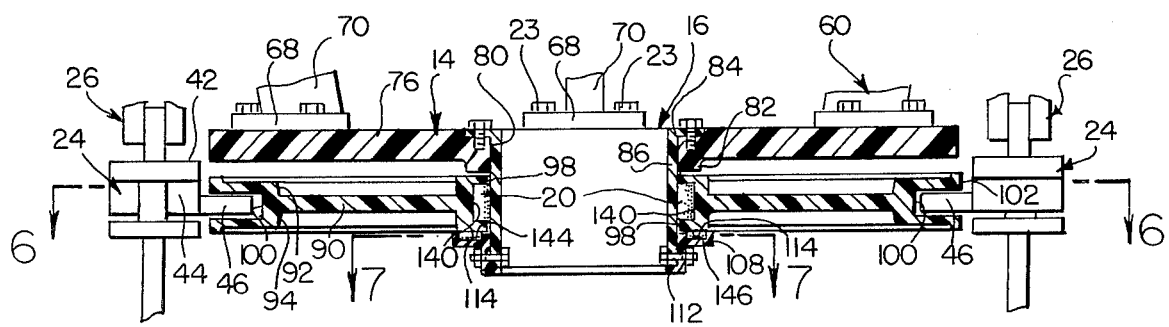
FIG. 5 is a vertical sectional view similar to that illustrated in FIG. 2 showing a slightly modified wheel structure.
Figure 6:
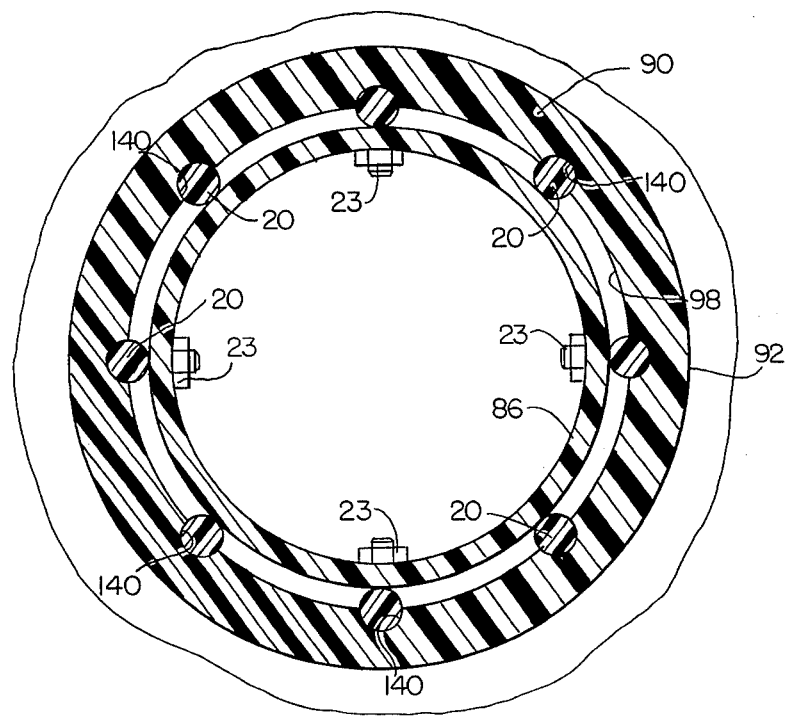
FIGS. 6 and 7 are horizontal sectional views taken substantially on the lines 6—6 and 7—7 respectively of FIG. 5.
Figure 7:
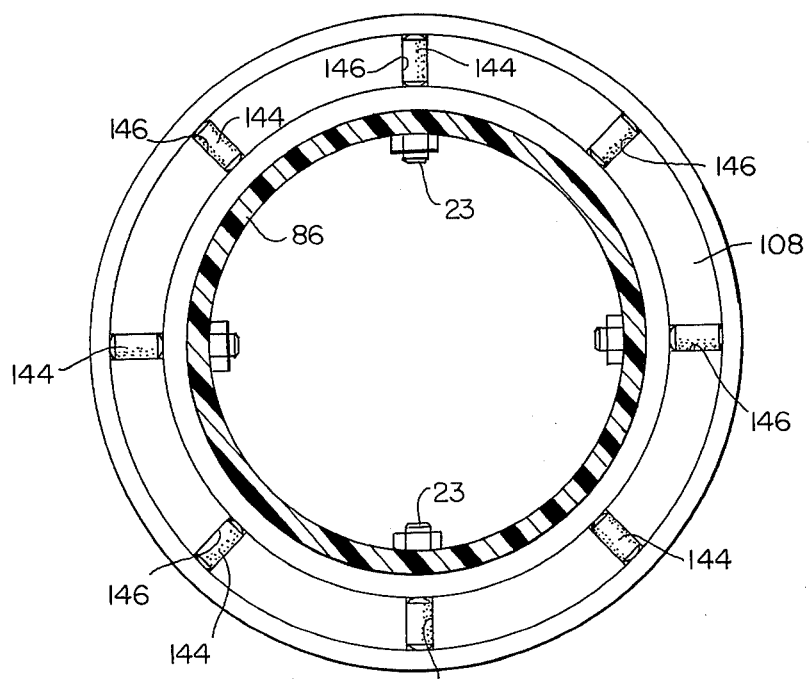

A slight modification of the wheel structure 10 is illustrated in FIGS. 5, 6 and 7, wherein the wheel 18 is provided at its recessed bore 98 with a plurality of spaced apart vertical bearings 20 rotatably seated in pockets or recesses 140, and with its lower bearing surface 114 adapted to rotate and ride upon the spaced apart horizontal thrust bearings 144 rotatably seated in radial recesses 146 of the distal upper end collar flange 108. The horizontal bearing structure reduces the frictional contact made by the wheel surface 114 at the collar flange 108 (FIG. 2), in high load applications.

Figure 8:
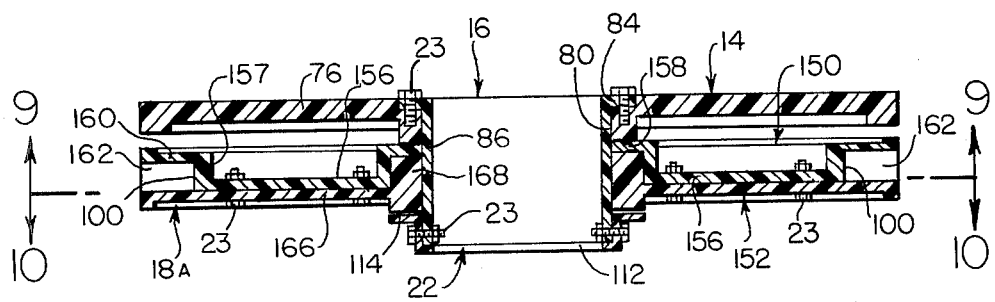
FIG. 8 is a vertical sectional view similar to FIG. 5, but showing the wheel made of two components.
Figure 9:
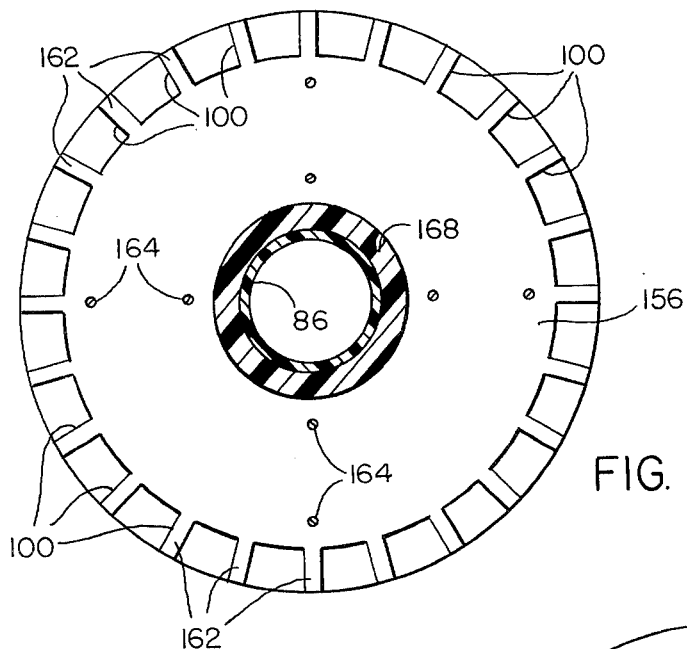
FIGS. 9 and 10 are bottom plan and top plan views respectively taken substantially on the lines 9—9 and 10—10 respectively of FIG. 8.
Figure 10:
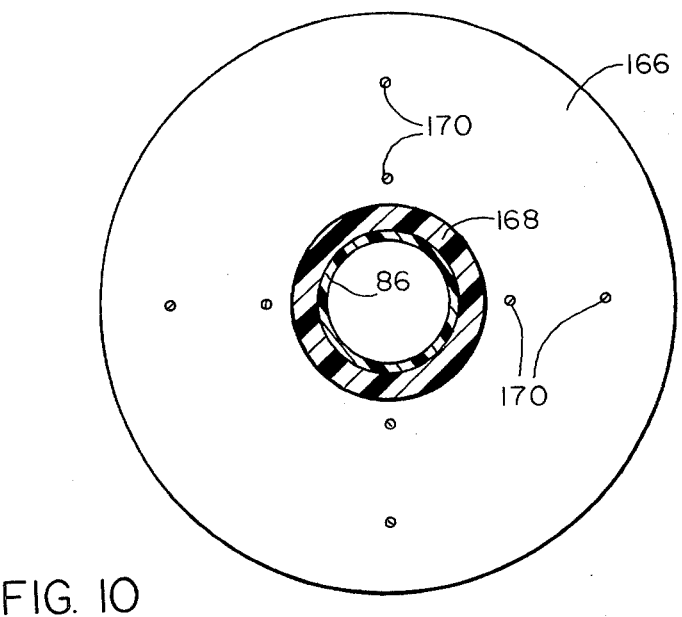

Although the wheel 18 is illustrated and described above as being made as a single integrally formed molded plastic piece or element, it can also be made of two pieces or components secured together at their web sections by suitable fasteners, as illustrated in FIGS. 8, 9 and 10. The two piece wheel 18a comprises an upper wheel section or component 150 and a lower wheel section or component 152.

The upper wheel component 150 comprises the annular web section 156, an annular recess 157 in the web section, an annular hub flanges 158, a peripheral flange 160 and radially extending spaced apart ribs 162 defining the chain link drive spoke pockets or recesses 100. The web section 156 is provided with a plurality of openings 164 therethrough for the fasteners 23 that secure the upper and lower wheel components 150 and 152 respectively together.

The lower wheel component 152 comprises the annular plate section 166, the solid hub section 168 and a plurality of openings 170 through the plate section for the fasteners 23 that secure the upper and lower wheel components 150 and 152 respectively together.

The wheel 18, as the wheel 18a, can be made without the use of roller bearings 20 or 146, a single solid hub section 168 providing the vertical and horizontal bearing surfaces for the hub bearing portion 86 and the collar annular bearing flange 108 at its upper thrust surface, respectively.

The plastic structural supporting members 32, 32, the frame members 62, 64, 66 and the vertical members 60 are preferably made of the Zytel ® or Delrin ® plastic materials, or other suitable equivalent materials, as integral, unitary components by the molding, extrusion or pultrusion processes, whichever is most suitable and practical.

The arcuate monorail conveyor track section 30 is preferably made by the molding process as an integral, unitary plastic product of the Zytel ®, Delrin ® or other suitable equivalent materials.

Similarly, the disc support 14, wheel 18 or the two component wheel 18a, and collar 22, and the bearings 20 and 144, are each preferably made by the molding or extrusion process of the Zytel ®, Delrin ®, or other suitable equivalent materials, as integral, unitary plastic components.

Having disclosed herein certain particular preferred embodiments of the invention for purposes of explanation, further modifications or variations thereof, after study of this specification, will or may occur or become apparent to persons skilled in the art to which the invention pertains. Reference should be had to the appended claims in determining the scope of the invention.

I claim:

1. In a plastic monorail conveyor structure including contiguous connected straight and arcuate sections of an inverted T-bar track in end-to-end abutting relationship, the improved idler or drive wheel structure operatively engaged by a chain drive for an arcuate section of said monorail conveyor structure comprising:
   a plastic disc support plate,
   structural means affixed to and supporting said disc support plate in a relatively elevated attitude adjacent and below the plane and axially of said arcuate T-bar track section,
   a plastic hub secured to said disc support plate and having a cylindrical bearing portion extending axially therefrom and therebelow,
   a chain drive engaged plastic wheel freely rotatable about said hub bearing portion,
   and a plastic collar secured to said hub bearing portion at the distal end thereof,
   said wheel being rotatable and bearing upon a thrust surface of said collar.

2. The improved wheel structure defined in claim 1, wherein:
   said structural means comprises:
      a plurality of integrally formed, unitary, molded and supporting vertical members secured to said disc support plate and to superposed structural framing members,
      said vertical members each comprising a vertical portion, a base plate affixed to said disc support plate and a lateral outwardly facing plate portion affixed to said T-bar arcuate track section.

3. The improved wheel structure defined in claim 2, wherein:
   said structural means further comprises:
      structural framing members affixed to said vertical members at said vertical portions.

4. The improved wheel structure defined in claim 1, wherein:
   said disc support plate comprises:
      a flat circular plate body having an axial bore therethrough.

5. The improved wheel structure defined in claim 4, wherein:
   said flat circular plate body has a relatively short concentric hub portion on its lower side adjacent said axial bore to provide a spacer between said disc support plate and said wheel.

6. The improved wheel structure defined in claim 4, wherein:
said hub further comprises:
an upper outwardly directed annular flange affixed to said disc support plate,
said cylindrical bearing portion extending axially through said bore.

7. The improved wheel structure defined in claim 1, wherein:
said wheel comprises:
an annular body having a bore axially therethrough,
an annular bearing recess in said body at said bore,
vertical bearings in said bearing recess for said hub cylindrical bearing portion,
and means complementary to and engageable with said chain drive in the outer periphery of said annular body.

8. The improved wheel structure defined in claim 7, wherein:
said means in the outer periphery of said annular body comprises a plurality of pockets or recesses complementary with portions of said chain drive and lying in a plane.

9. The improved wheel structure defined in claim 1, wherein:
said wheel comprises:
an annular body having a bore axially therethrough,
a plurality of radially spaced apart vertical bearing recesses in said body at said bore,
vertical bearings in said vertical bearing recesses for said hub cylindrical bearing portion,
and means complementary to and engageable with said chain drive in the outer periphery of said annular body.

10. The improved wheel structure defined in claim 9, wherein:
said means in the outer periphery of said annular body comprises a plurality of pockets or recesses complementary with portions of said chain drive and lying in a plane.

11. The improved wheel structure defined in claim 1, wherein:
said arcuate track section comprises:
an arcuate inverted longitudinally extending upstanding T-bar stem and an arcuate longitudinally extending laterally outwardly extending flange from each side and at the distal end of said stem,
said flanges lying substantially in a plane transversely of said stem.

12. The improved wheel structure defined in claim 11, wherein:
said arcuate track section stem and lateral flanges are aligned:
and contiguous with corresponding elements of said next adjacent straight track sections.

13. The improved wheel structure defined in claim 11, wherein:
said arcuate longitudinally extending upstanding inverted T-bar stem is provided at least in part with:
a longitudinally extending pendant lobe on each side of, spaced in part outwardly from, and substantially in parallel with the lateral surfaces of said stem.

14. The improved wheel structure defined in claim 1, wherein:
said collar comprises:
an upper laterally outwardly directed annular thrust bearing flange,
a cylindrical body portion extending axially of said upper bearing flange.

15. The improved wheel structure defined in claim 14, wherein:
said collar further comprises:
a lower inwardly directed annular flange.

16. The improved wheel structure defined in claim 14, wherein:
said collar is affixed to said hub adjacent its distal end.

17. The improved wheel structure defined in claim 14, wherein:
said collar upper annular bearing flange is provided with a plurality of spaced apart horizontally radial bearing recesses in its upper surface,
and horizontal bearings in said radial recesses for said wheel to rotate upon.

18. The improved wheel structure defined in claim 14, wherein:
said collar upper annular bearing flange provides a bearing surface for said wheel to rotate upon.

19. The improved wheel structure defined in claim 1, wherein:
said improved wheel structure includes power drive means operatively engageable with said wheel.

20. The improved wheel structure defined in claim 19, wherein:
said power drive means comprises:
a power driven motor,
a speed reducer operatively associated with said motor,
a drive sprocket driven by said speed reducer,
and sprocket drive means operatively engageable with said wheel.

21. The improved wheel structure defined in claim 1, wherein:
said wheel comprises:
an upper wheel component and a lower wheel component, said wheel components being secured together to form a unitary wheel assembly operatively engageable and driven by said chain drive.

22. The improved wheel structure defined in claim 21, wherein:
said wheel components when secured together define:
a plurality of radially spaced apart chain drive flange receiving pockets in the peripheral edge of said wheel, said wheel being freely rotatable about said hub cylindrical bearing portion and upon said collar thrust bearing surface.

23. The improved wheel structure defined in claim 22, wherein:
said upper wheel component is provided with a plurality of radially directed spaced apart depending ribs adjacent the peripheral edge of said component defining said chain drive flange receiving pockets when said upper and lower wheel components are secured together.

24. The improved wheel structure defined in claim 22, wherein:
said lower wheel component is provided with an annular axial solid hub section rotatable upon and about said hub cylindrical bearing portion.

* * * * *